May 13, 1952   H. S. ROSS   2,596,869
VALVE
Filed Sept. 27, 1949
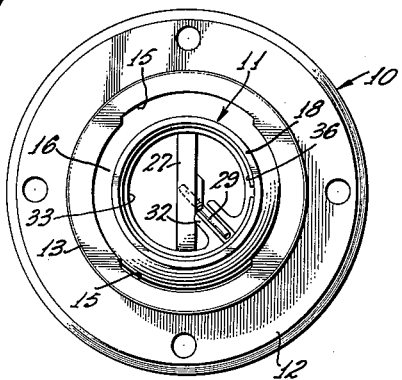
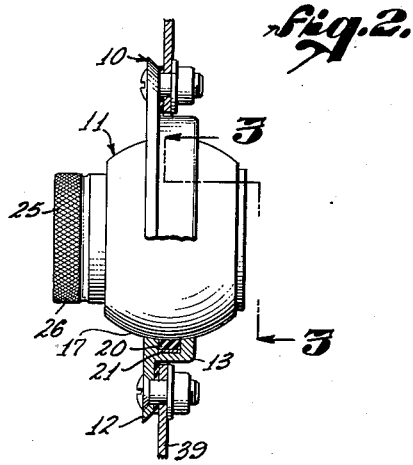
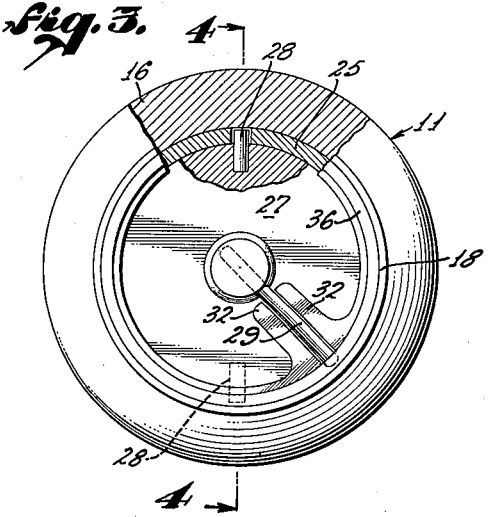
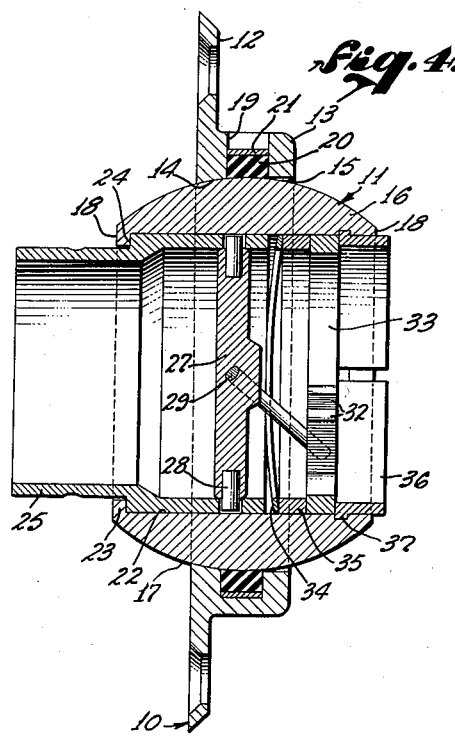
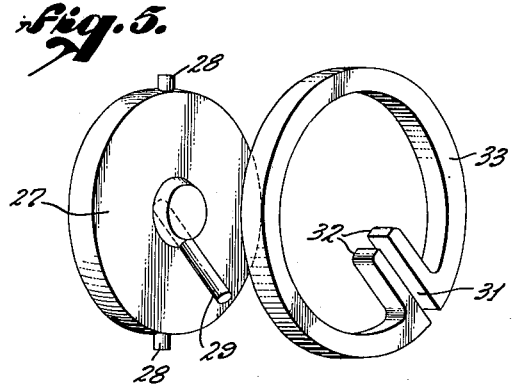
HOWARD S. ROSS,
INVENTOR.
BY
ATTORNEY.

Patented May 13, 1952

2,596,869

UNITED STATES PATENT OFFICE 2,596,869

VALVE

Howard S. Ross, Beverly Hills, Calif., assignor to Wemac Company, Inglewood, Calif., a copartnership composed of Frank J. Mufich and John J. Mufich Application September 27, 1949, Serial No. 118,033

13 Claims. (Cl. 251—11)

This invention relates to mechanisms having the structural character of valves and for the purpose of illustration is directed to a valve adapted to be mounted on a wall of a vehicle such as an airplane, train or other public conveyance for controllably admitting ventilation air thereinto.

Valves of the type herein disclosed have been heretofore proposed and used, but have been subject to a number of objections. Such valves as have been proposed heretofore have generally been complex in proportion to their size and scope of utility, especially if they were adjustable, not only to control the volume of air admitted, but to also control the angle at which the air is directed into the vehicle. Moreover, many of the valves heretofore used created objectionable noises, particularly when the same were throttled down to reduce the volume of air admitted.

To produce a large range of angular adjustment of the valves, it has been previously proposed to employ a complicated multi-part mounting bracket which not only increased assembly time but the cost of the valve as well. These prior brackets often failed in use, particularly where subject to vibration as the multiplicity of parts tended to come apart or loosen.

The valve of the present invention is free of the objections mentioned above, for the same is quite compact, easily adjusted, both as to volume of air admitted and direction, and is mountable to the wall of the vehicle by a simple unitary mounting bracket. As the mounting bracket of the valve of the present invention is unitary, it is more easily assembled and installed than the multi-piece brackets of many of the prior valves and has a relatively longer service life. Although the mounting bracket is of a one-piece construction, it does not in any way restrict the range of angular adjustment of the body of the valve.

Air valves of the type herein shown and disclosed are generally mounted to the wall vents in such a manner that only the discharge end is accessible. This limits the location and disposition of the operating means for not only adjusting the valve relative to the wall to directionally control the air discharge therefrom, but also the means for controlling the volume of air admitted. This, in turn, has to some extent limited the shape and form of the relatively movable elements of the valve which coact together to control flow of air through the valve. In many of the prior valves, the selection of the valve elements directly controlling the flow of air to the same, has been at the expense of the maximum volume of air possible of passing through the valve at any one time. As these valve parts have restricted the air passing through the valve, they have inherently created Venturi effects which obviously increases the speed of the air passing through that portion of the valve. The increase in velocity of the air has increased the noise level of these valves. Valves having a high noise level are objectionable, for they are irritating to a passenger, particularly over long periods.

The valve of the present invention is formed with a substantially cylindrical air passage or throat, which is substantially constant in cross-sectional shape so that no sharp corners or reduced bores are presented which tend to create noises or increase the speed of the air passing through the valve which also, as should be understood, tends to create noises or sounds.

To vary the volume of air passing through the valve, a relatively thin disc of the same diameter as the inner diameter of the cylindrical throat is pivotally mounted within the throat for movement about an axis coincident with a diameter of the disc. In one position of the disc the same extends transversely of the throat and closes the same to the passage of air therethrough, and is movable through an infinite number of positions to a position in which the opposite faces of the disc are substantially parallel to the longitudinal axis of the throat. In this last position the disc offers very little hindrance to the flow of air through the throat for merely the thickness of the disc is restricting the flow through the throat. As the disc offers very little restriction to flow of air through the throat when the valve is in an open position, air moving through the throat is changed little in direction and there is very little pressure drop across the valve. This permits, as will be understood, a relatively large air flow even though the air upstream from the valve is subject to relatively low pressure.

Although it is of course known that a butterfly valve provides little resistance to fluid flow, particularly in the open position of the valve, such valves have not been adapted to airflow control means of the type herein shown for it has been difficult to provide an efficient means of operating the same and one which did not unduly increase the size of the valve. The disc or butterfly of the valve of the present invention is operated or moved by mounting for rotation a tubular member forming a part of the cylindrical throat across which the disc is pivotally mounted. The disc thus rotates with the tubular member as the latter is manually rotated and to bring about the pivotal or tilting movement of the disc simultaneously with rotation of the tubular member, a pin is so angularly fixed to the disc that the longitudinal axis thereof intersects the axis of rotation of the disc at the intersection of the minor and major axes of the disc. The longitudinal axis of the pin thus lies in a plane which intersects the disc at a major axis and a projection of the pin on the disc extends radially thereon. The free end of the pin is mounted in a fixed guideway radially extending or projecting into the throat of the valve and restrains the pin against circular movement as the disc rotates with the tubular member. As the disc revolves with the tubular member the pin held against revolving movement therewith exerts a reaction force on the pin which rocks or tilts the disc about the diametral pivotal axis. Thus rotation of the tubular member about its longitudinal axis produces pivotal movement of the disc about an axis which is normal to the longitudinal axis of the tubular member without the use of any gearing or other like means which would obviously not only complicate the assembly of the valve but its mounting as well.

Other features and advantages of the present invention will be hereinafter apparent from the following detailed description thereof, particularly when taken in connection with the accompanying drawing, in which:

Figure 1 is an elevational view of the inlet end of the valve showing the butterfly in the fully opened position;

Figure 2 is a side elevational view of the valve, partly in section, shown mounted to a bulkhead or the like;

Figure 3 is a section on a somewhat enlarged scale taken along line 3—3 of Figure 2;

Figure 4 is a section on an enlarged scale taken along line 4—4 of Figure 3; and Figure 5 is an exploded view of the disc and the member on which the guideway is formed for receiving the pin carried by the disc.

The valve of the present invention, referring now to the drawing and more particularly to Figures 1 and 4 thereof, comprises a one-piece mounting bracket 10 and a valvular unit 11 mounted therein for universal movement to control the direction of air admitted through the valve into the vehicle with which it is used.

The mounting bracket 10 consists of a cylindrical plate 12 of some suitable metal having a centrally located circular opening therein. A hollow boss or collar 13 circumscribes the defining edge of the opening and extends substantially normal to the one face of the mounting plate 12. The inner surface 14 of the boss or collar has a spherical contour, that is, the inner surface defines a surface of a zone of a sphere. The inner surface of the boss or collar 13 at the one end thereof, and in diametrically opposed locations, is provided with arcuate kerfs or grooves 15. The grooves 15 permit the insertion into the mounting bracket of a valve body member 16 having the form of a hollow zone of a sphere of substantially the same radius as the spherical surface defined by the inner surface 14 of the boss or collar 13.

In assembling the valve body 16 with the mounting bracket 10, the body is inserted edgewise or in a transverse position into the opening of the bracket with the portions of the spherical surface 17 of the body which lie at the end of any major or transverse axis fitting into the kerfs or grooves 15. In this position, the truncated or end faces 18 of the valve body lie in parallelism with the minor axis of the boss or collar 13. The valve body is then urged inwardly until the center of curvature of the spherical surface 17 is coincident with the center of curvature of the spherical surface 14, after which the valve body is rotated until the truncated end faces 18 lie in parallelism with the planar portions of the mounting bracket 10. It should be seen now that the valve body 16 is mounted for universal movement relative to the mounting bracket 10.

To frictionally hold the valve body in a desired position of adjustment relative to the bracket, the spherical inner surface 14 of the latter is formed with an annular groove 19 receiving a spring-urged gasket assembly. The gasket member 20 of the assembly is preferably formed of a strip of fibrous material, such as felt, disposed in the groove 19 and urged inwardly somewhat radially of the mounting bracket by one or more resilient metallic strips 21. The spring pressed felt gasket 20 not only frictionally holds the valve body against accidental movement relative to the mounting bracket, but also cooperates with the valve body to form an airtight seal between the same and the mounting bracket.

The valve body 16 is formed with a longitudinally disposed passage presenting a cylindrical wall surface 22. An inwardly directed annular flange 23 formed at the one end of the passage provides an annular shoulder against which seats an annular flange 24 of a tubular member 25 supported by the cylindrical wall surface 22 for rotation relative to the valve body. The tubular member projects outwardly from the one surface 18 of the cylindrical body member 16 and the projecting end portion is knurled as indicated at 26. This knurled projecting portion of the tubular member, as will later be seen, provides an actuator for not only varying the amount of air passing through the valve, but the direction of the air as well.

The tubular member 25 forms, as will be seen, a part of the throat or air passage of the valve and carries the butterfly element of the valve. This element comprises a disc 27 of substantially the same diameter as the inner diameter of the tubular member 25. The disc carries at diametrically opposite points outwardly projecting aligned pins 28 loosely received within openings formed in the tubular member 25. The disc thus is pivotally movable about an axis coincident with the longitudinal axis of the aligned pins 28 and this axis is, of course, coincident with a diameter of the disc. The disc 27, although it is pivotable about a major axis of the disc, also revolves with the tubular member as the latter is turned about its longitudinal axis.

To bring about rotation or tilting of the disc relative to the tubular member as the latter is rotated, the disc carries an operating member in the form of a fixed pin 29 angularly extending from the one face thereof. The pin 29 must be so carried by the disc that the longitudinal axis of the pin intersects the pivotal axis of the disc at the point where the minor axis of the disc intersects the pivotal axis. Thus, the pin is so fixed to the disc that a projection of the pin onto the disc extends radially of the same. The free end of the pin 29 is controlled by a suitable radial guide. In the particular construction shown, the pin 29 is received between a pair of closely spaced parallel members, the adjacent walls of which form a fixed guideway 31 which radially projects into the throat or air passage of the valve. The longitudinal axis of the guideway 31 is disposed in a plane containing the longitudinal axis of the tubular member and the intersection of the minor and major axes of the disc. Thus as the tubular member 25 is rotatably moved about its longitudinal axis, the disc as it is mounted to diametrically opposed points on the inner wall of the tubular member by the pins 28 will also revolve with the tubular member. As the pin 29, however, is held by the guideway 31 against movement except angular movement in the plane fixed by the guideway, the reaction forces created by the rotation of the disc with the tubular member tilts the disc about the axis of the pins 28. This is so, for rotation of the disc about its minor axis, when the disc is closing the tubular member, and is in a position in which its minor axis is coincident with the longitudinal axis of the tubular member 25, forces the free end of the pin 29 against the one wall of the fixed guideway 31. This wall hereafter acts, as the disc continues to rotate with the tubular member, as a cam to apply to the follower formed by the free end of the pin 29 forces having a component normal to the pivotal axis established by the pins 28. This obviously will result in the disc 27 simultaneously tilting or rotating about its pivotal axis as it rotates with the tubular member to move the disc to its valve-open position.

With the disc in a position in which the minor or longitudinal axis thereof is normal to the longitudinal axis of the tubular member, that is, with the disc in its valve-open position, rotation of the tubular member in the opposite direction will force the free end of the pin against the opposite wall of the guideway and the resulting component, again normal to the pivotal axis of the disc but now oppositely directed, will, as the disc rotates with the tubular member, simultaneously tilt the disc in the opposite direction to a position in which it is closing the tubular member.

The various relationships that enter into the mode of operation for controlling the rotary position of the disc 27 may be seen in Figures 1, 3, and 4. It will be noted that the pin 29 is aligned with the center of the disc 27 and is positioned at approximately 45° in three different respects, namely; first with respect to the longitudinal or minor axis of the disc 27 as may be seen in Figure 4; second, with respect to the pivot axis of the disc defined by the two pins 28; and third, with respect to the plane or face of the disc 27. It will also be noted that the guideway 31 into which the pin extends is positioned radially of the passageway in a plane normal to the axis of the passageway and at approximately 45° to the pivot axis of the disc 27 both when the disc is in the open position shown in Figure 1 and in the closed position shown in Figure 2.

The guideway 31 may be formed by laterally extending fingers 32 carried at the opposite ends of a resilient strip 33 coiled into a circular or annular form. The fingers 32, after the strip is formed into the circular shape, extend inwardly thereof to form the guideway. The pin 29 also acts to limit pivotal movement of the disc 27 as the tubular member 25 is rotated in either direction. The pin is so angularly carried by the disc and of such a length relative to the diameter of the passage that the free end of the pin moves into engagement with the wall of the passage intermediate the roots of the fingers 32 as the disc moves into its closing as well as its open position. Engagement of the pin with the wall of the passage obviously will prevent further movement of the disc in the direction which moved the pin into engagement with the wall.

In the assembly of the valve of the present invention, the tubular member 25 is inserted through the longitudinal passage of the valve body 16 until the annular flange thereon is brought into engagement with the shoulder of the valve body. A resilient washer 34 is now placed within the longitudinal passage of the valve body to contact the inner edge face of the tubular member 25. A spacing washer 35 is coaxially mounted within the passageway, after which the coiled resilient strip 33 is circumferentially compressed and inserted within the longitudinal passage.

In this operation care must be taken to insure that the free end of the pin 29 is properly engaged in the guideway 31 formed by the inwardly extending parallel fingers 32. After the strip 33 has been mounted within the longitudinal passage with the end of the pin 29 riding in the guideway 31, a snap ring 36 formed with an outturned annular flange 37 is radially compressed and inserted into the longitudinal passage to bring the flange 37 into alignment with a groove formed in the wall of the passage of the valve body. The ring 36 is then released to permit the flange 37 to snap into the groove formed in the wall of the passage. This completes the assembly operation of the valve, for it will be seen that the assembled members are now held against longitudinal movement relative to the valve body 16.

Although both the resilient washer 34 and the coiled strip 33 tend to hold the tubular member 25 against accidental rotation which would, of course, pivotally move the disc 27, neither exerts sufficient force to prevent rotation of the tubular member when the knurled portion 36 is grasped by the user and turned to move the tubular member about its longitudinal axis.

The valve is mounted within the vehicle as shown in Figure 2 by securing the mounting bracket or plate 12 to a bulkhead or wall element 39 with the valve body projecting through an opening formed in the bulkhead 39. Air entering the rightward end of the valve body as viewed in Figure 2, which is the entrance or inlet end of the valve, passes through the longitudinal passage if the disc has been moved to a position in which it is not fully closing the longitudinal passage, and then exits through the projecting ends of the tubular member into the interior of the vehicle.

To control the volume of air passing through the vehicle, it is only necessary, as above explained, to rotate the tubular member 25 to bring about the tilting or pivotal movement of the disc 27 about the pivotal axis established by the pin 28. With the disc 27 to its fully opened position, there is very little restriction to air flow through the valve as the thickness of the disc relative to the cross-sectional area of the tubular member 25 is relatively small. The velocity of the air flowing about the disc is therefore not greatly increased in velocity which might otherwise produce objectionable noises caused by varying velocities of the air moving through the valve. Furthermore the pressure drop across the valve of the present invention is relatively low so that a maximum volume of air will flow through the valve even though the pressure of the air at the entrance or inlet end of the valve is relatively low.

It should be seen now that the valve of the present invention provides a maximum size air passage with a minimum valve size so that the valve is particularly adapted for use in the aircraft industry where weight is a major consideration. The means of operating the butterfly or disc of the valve is one not likely to fail in use so that the service life of the valve is a relatively long one.

The knurled end 26 of the tubular member 25 forms a common actuator for not only varying the amount or volume of air discharged from the valve, but is also used as well to control the direction of the discharged air. This is so, for a user may merely grasp the knurled end of the tubular member and rotate the valve body 16 relative to the mounting bracket 12 to angularly adjust the valve body relative to the bulkhead 39 and thus direct the air discharge in any direction desired.

Although the now preferred embodiment of the present invention has been shown and described herein, it is to be understood that the invention is not to be limited thereto, for it is susceptible to changes in form and detail within the scope of the appended claims. It will also be apparent to those skilled in the art that while the invention has been described as a valve for the purpose of disclosure, the operating principles involved may be applied to other devices of the same general structural character wherein it is desired to provide rotary control for a disc pivotally mounted in a passageway.

I claim:

1. Valve-like mechanism of the type described, comprising: a body having a passageway extending therethrough and presenting a cylindrical wall surface; a tubular member mounted within said passageway and supported by said wall surface for rotation about the longitudinal axis thereof; a disc of a diameter substantially equal to the inner diameter of said tubular member; a pair of oppositely projecting, diametrically aligned pins carried by said disc and engaged in aligned openings formed in said tubular member for mounting said disc across the bore of said tubular member for rotational movement therewith and for pivotal movement about an axis coincident with a major axis of said disc; and means made operative by rotation of said tubular member for moving said disc about its pivotal axis whereby rotation of said tubular member pivotally moves the said disc to variably restrict the bore of said tubular member to the passage of air therethrough, said last named means including a pin so angularly carried by said disc that the longitudinal axis of the pin passes through said disc at the intersection of the minor and major axes thereof, and a fixed guideway restraining movement of said pin.

2. A valve-like mechanism of the type described, comprising: a body having a passageway extending therethrough and presenting a cylindrical wall surface; a tubular member mounted within said passageway and supported by said wall surface for rotation about the longitudinal axis thereof; a disc of a diameter substantially equal to the inner diameter of said tubular member; means for mounting said disc across the bore of said tubular member for rotation with the tubular member and also for pivotal movement about an axis coincident with a major axis of said disc and normal to the longitudinal axis of said tubular member; a pin angularly projecting from the one face of said disc, the longitudinal axis of said pin intersecting the pivotal axis of said disc at the intersection of the latter and the minor axis of said disc; a guideway fixed to said body and radially projecting into the passageway therethrough, said guideway holding said pin against rotation with said disc as said tubular member is rotated and exerting reaction forces on said pin having a component normal to the pivotal axis of said disc whereby said disc is simultaneously pivoted about said pivotal axis as it rotates with said tubular member about the longitudinal axis of the same; and means carried by said tubular member and projecting outwardly of said body for manually rotating said tubular member to vary the flow of air through said valve.

3. A device of the character described, comprising: a body member; a tubular member rotatably mounted in said body member, said body member and tubular member providing a passageway; a disc in said passageway pivotally mounted on one of said members for rotation about an axis extending diametrically of the passageway; a guide mounted on the other of said members, said guide extending radially of the passageway; and an operating member having one end mounted on said disc and the opposite end in movable engagement with said guide, said operating member extending in a direction from the center of the disc at an acute angle relative to the face of the disc.

4. A device as set forth in claim 3 in which said direction is at an acute angle relative to the pivot axis of the disc.

5. A device as set forth in claim 4 in which said direction is at an acute angle relative to the longitudinal axis of said disc.

6. A device as set forth in claim 3 in which said operating member is a pin aligned with the center of the disc.

7. A device as set forth in claim 3 in which the radial alignment of said guide is at an acute angle relative to the pivot axis of said disc when the disc is positioned normally to the axis of said passageway.

8. A device as set forth in claim 3 in which the radial alignment of said guide means is at substantially the same angle relative to the pivot axis of said disc both when the disc is turned parallel to the axis of the passageway and when the disc is turned perpendicularly to the axis of the passageway.

9. A device as set forth in claim 3 in which said guide has a stop portion to limit movement of said control member thereby to limit rotation of said disc.

10. A device as set forth in claim 3 in which said disc is pivotally mounted on said tubular member and said guide is mounted on said body member.

11. A device of the character described, comprising: a body member; a tubular member rotatably mounted in said body member, said body member and tubular member providing a passageway; a disc in said passageway pivotally mounted on one of said members for rotation about an axis extending diametrically of the passageway between a position substantially perpendicular to the axis of the passageway and a position substantially parallel with the axis of the passageway; a guide mounted on the other of said members, said guide providing a guideway extending radially of the passageway at an acute angle relative to the pivot axis of the disc when the disc is in one of said positions; and a pin mounted on said disc in sliding engagement with said guideway, said pin being aligned with the center of the disc at an acute angle relative to the plane of the disc as well as relative to the longitudinal axis of the disc and also relative to the pivot axis of the disc.

12. A device as set forth in claim 11 in which said angle of the guideway and said angle of the pin are approximately 45 degrees.

13. A device as set forth in claim 12 in which said disc is pivotally mounted on said tubular member and said guide is mounted on said body member.

HOWARD S. ROSS.

REFERENCES CITED

The following references are of record in the file of this patent:

UNITED STATES PATENTS

| Number | Name | Date |
|---|---|---|
| 1,759,060 | Moore | May 20, 1930 |
| 2,462,989 | Mufich | Mar. 1, 1949 |